United States Patent

Fujiki et al.

[11] Patent Number: 4,469,750
[45] Date of Patent: Sep. 4, 1984

[54] MAGNETIC RECORDING MEDIA COMPRISING FLUORINATED ORGANOSILICONES IN A MAGNETIC LAYER THEREOF

[75] Inventors: Kuniharu Fujiki; Yukio Matsumoto; Hiroshi Yoshida, all of Mito, Japan

[73] Assignee: Victor Company of Japan, Limited, Yokohama, Japan

[21] Appl. No.: 517,711

[22] Filed: Jul. 27, 1983

[30] Foreign Application Priority Data

Jul. 29, 1982 [JP] Japan ................. 57-131151

[51] Int. Cl.³ ............................ G11B 5/68; G11B 5/70
[52] U.S. Cl. ............................. 428/447; 252/62.54; 360/134; 360/135; 360/136; 427/128; 428/480; 428/694; 428/695; 428/900
[58] Field of Search ............... 428/447, 480, 694, 695, 428/900; 427/128; 232/62.54; 360/134–136

[56] References Cited

U.S. PATENT DOCUMENTS

| | | | |
|---|---|---|---|
| 4,007,313 | 2/1977 | Higuchi | 428/900 |
| 4,369,230 | 1/1983 | Kimura | 428/900 |
| 4,431,703 | 2/1984 | Somezawa | 428/900 |

FOREIGN PATENT DOCUMENTS 52-108804 9/1977 Japan .
57-12420 1/1982 Japan .

*Primary Examiner*—Ellis P. Robinson
*Attorney, Agent, or Firm*—Lowe, King, Price & Becker

[57] ABSTRACT

Magnetic recording media are described which comprise a support having a magnetic recording layer thereon. The magnetic recording layer is made of a dispersion of magnetic particles in a binder and a specific type of fatty acid-modified, fluorinated organosilicone. The organosilicone is represented by the general formula

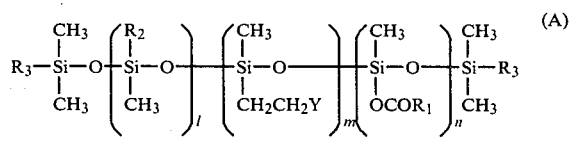

in which $R_1$ represents a monovalent saturated or unsaturated hydrocarbon having 7 to 21 carbon atoms, $R_2$ represents a methyl or phenyl group, each $R_3$ represents a $OCOR_1$ in which $R_1$ has the same meaning as defined above, Y represents $-CF_3$ or $-(CF_2)-_kW$ in which k is an integer of from 1 to 8, and W is hydrogen or fluorine, and l, m and n are independently an integer provided that $0 \leq l < 200$, $1 \leq m < 100$, $1 \leq n < 100$, and $1 + m + n \leq 300$.

6 Claims, 1 Drawing Figure

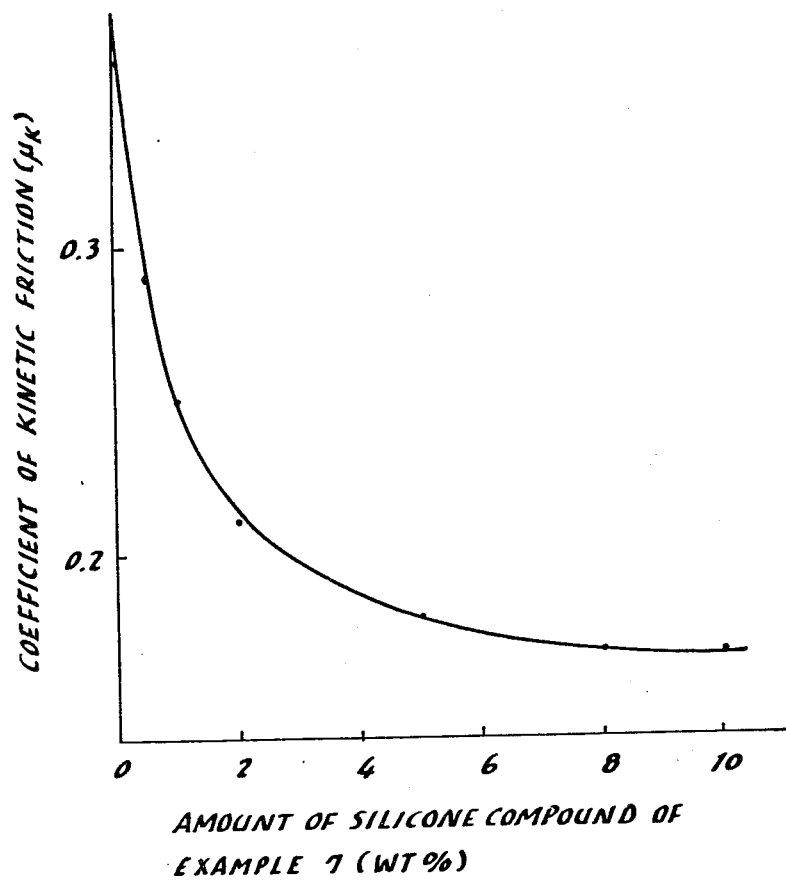

MAGNETIC RECORDING MEDIA COMPRISING FLUORINATED ORGANOSILICONES IN A MAGNETIC LAYER THEREOF

BACKGROUND OF THE INVENTION

1. Field of the Invention

This invention relates to the magnetic recording art and more particularly, to magnetic recording media comprising a specific type of fluorinated organosilicone compound as a lubricant.

2. Description of the Prior Art

Home video tape recorders have recently become popular, and portable types of small-size video tape recorders are now increasing in number. Moreover, video tape recorders of the type having a built-in video camera therein have been developed and are now commercially sold. These video tape recorders require improvements of magnetic recording media not only in recording density, but also in surface smoothness and travelling performance. This is because recording and reproducing systems for use in these video tape recorders area so-called helical capstan systems using rotary magnetic heads and are provided with a mechanism for reproducing a still reproduction picture. Magnetic recording media, such as a magnetic tape, which are used in the above type of recording and reproducing apparatus, is travelled while contacting the magnetic heads, guide pins, and the like. Hence, the magnetic layer of the recording medium should have a low coefficient of friction to ensure a stable travelling performance. Additionally, because the magnetic layer tightly contacts the rotary magnetic heads at the time of recording and reproducing operations, it is required to have good abrasion resistance. With small-size, portable video tape recorders, they are frequently used under severe outdoor conditions which involve either high temperature and high humidity conditions, or low temperature conditions. Even under these conditions, magnetic recording tapes have to be stably travelled.

In order to improve the characteristics such that the magnetic layer of magnetic recording media has a small coefficient of kinetic friction, a stable travelling performance, and a good abrasion resistance, there has been proposed use of a number of lubricants. For instance, there are added to a magnetic layer silicone oils such as dimethyl silicone and diphenyl silicone, and fatty acid-modified organosilicone compounds of the following general formulas (I) (Japanese Laid-open Application No. 52-108804), and (II) (Japanese Laid-open Application No. 57-12420):

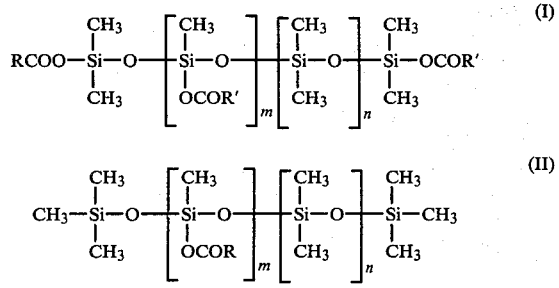

However, silicone oils such as dimethyl silicone and diphenyl silicone are not favorable. Although excellent in lubricating property, they have poor miscibility or compatibility with binders in the magnetic layer and are apt to exude on the surface of the magnetic layer, thus causing the surface to become sticky and lowering electromagnetic conversion characteristics such as S/N ratio.

The fatty acid-modified organosilicone compounds of the general formulas (I) and (II) have, respectively, the following defects. The compounds of the general formulas (I) and (II) have relatively high affinity for binders because of the fatty acid groups present therein and are relatively excellent in lubricating property because of formation of higher fatty acids by hydrolysis of the compounds on the surface of the magnetic layer. However, when the magnetic recording media using these compounds are placed under severe high temperature and high humidity conditions, the fatty acid-modified organosilicone compounds contained in the magnetic layer are hydrolyzed, resulting in an increase of its plasticizing effect and also in deterioration of the binder in the magnetic layer.

SUMMARY OF THE INVENTION

It is an object of the present invention to provide magnetic recording media which comprise a specific type of fatty acid-modified, fluorinated organosilicone compound in a magnetic layer by which the above drawbacks of the known fatty acid-modified organosilicones are overcome.

It is another object of the invention to provide recording media using a specific type of organosilicone compound which has good compatibility with various binders and are chemically stable without decomposition even under high temperature and high humidity conditions.

It is a further object of the invention to provide magnetic recording media whose magnetic layer has a low coefficient of kinetic friction and is thus excellent in abrasion resistance, travelling performance, and durability.

It is another object of the invention to provide magnetic recording media which do not cause magnetic heads and guide pins of a recording and reproducing apparatus to stain, with little image fluctuation occurring at the time of recording and reproducing operations even when travelled over a long term.

The above objects can be achieved, according to the present invention, by a magnetic recording medium which comprises a support having thereon a recording magnetic layer which is made of a dispersion of magnetic particles in a mixture of a binder and a lubricant, the lubricant being a fatty acid-modified, fluorinated organosilicone compound of the following general formula (A)

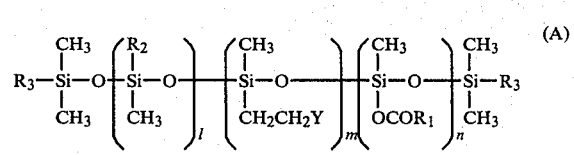

in which $R_1$ represents a monovalent saturated or unsaturated hydrocarbon group having from 7 to 21 carbon atoms, $R_2$ represents a methyl or phenyl group, each $R_3$ represents an $OCOR_1$ group wherein $R_1$ has the same meaning as defined above, Y represents $-CF_3$ or $-(CF_2)-_kW$ in which k is an integer of from 1 to 8 and W is a hydrogen or fluorine atom, and l, m and n are independently an integer provided that $0 \leq 1 \leq 200$, $1 \leq m \leq 100$, $1 \leq n < 100$, and $1+m+n \leq 300$.

BRIEF DESCRIPTION OF THE DRAWING

The sole FIGURE is a graphical representation of the coefficient of kinetic friction of a recording medium in relation to the amount of an organosilicone compound used in Example 4.

DETAILED DESCRIPTION AND PREFERRED EMBODIMENTS OF THE INVENTION

The present invention is characterized by the presence of the fatty acid-modified, fluorinated organosilicone compounds represented by the above formula (A) in the magnetic layer of magnetic recording media. As will be seen from the formula, the organosilicone compounds have, in the molecule thereof, fatty acid groups which have good affinity for binders, and thus show good compatibility therewith. The organosilicone compounds contain the fluorinated hydrocarbon groups therein, so that even when recording media using these compounds are placed under severe high temperature and high humidity conditions, they do not deteriorate and show a stable travelling performance. In addition, these fluorinated organosilicone compounds have little tendency to plasticize the binder resin in the magnetic layer. Thus, the magnetic layer is held tenacious and does not stain magnetic heads therewith when subjected to the long-term travelling operations.

In the formula (A), $R_1$ is defined as a monovalent saturated or unsaturated hydrocarbon group having from 7 to 21 carbon atoms. This is because compounds of the formula (A) in which the hydrocarbon group defined as $R_1$ has below 6 carbon atoms become poor in lubricating property particularly at relatively high temperatures, and are also unsatisfactory in durability when applied to a magnetic recording medium. On the contrary, when $R_1$ has over 22 carbon atoms, the compounds have poor compatibility with binder resins, and become poor in lubricating property at low temperatures.

$R_2$ in the formula is a methyl or phenyl group. When the phenyl group is selected, its content should preferably be in the range of smaller than about 10 mol% of the total organic groups joined to Si atoms.

Each $R_3$ is a fatty acid residue represented by the formula, $OCOR_1$, in which $R_1$ has the same meaning as defined above. Specific examples of the $OCOR_1$ groups include saturated fatty acid residues such as capryl, decyl, lauryl, myristyl, palmityl, stearyl, behenyl, and the like, and unsaturated fatty acid residues such as zoomaryl, oleyl, linoleyl, linolenyl, gadoleyl, and the like.

Y is a fluorinated alkyl group as defined before. l, m and n are, respectively, an integer provided that $0 \leq l < 200$, $1 \leq m < 100$, $1 \leq n < 100$, and $1+m+n \leq 300$. Preferably, $0 \leq l < 100$ and $1+m+n \leq 200$.

An organosilicone compound of the formula (A) in which $R_1$ represents $C_{13}H_{27}$, $R_2$ represents $CH_3$, each $R_3$ represents $C_{13}H_{27}COO$, and Y represents $—(CF_2)_7CF_3$ a particularly shown in Example 3 is especially preferred because of its efficacy.

The fatty acid-modified, fluorinated organosilicone compounds of the present invention are generally used in an amount of about 0.5 to 10 wt%, preferably 1 to 8 wt%, of magnetic particles. Amounts larger than 8 wt% result in a smaller coefficient of kinetic friction, and bring about so high a plasticizing effect on the magnetic layer that the durability of the layer lowers at the time of reproduction over a long term. Smaller amounts result in a smaller effect of the addition.

The oranosilicone compounds of the formula (A) according to the invention can be prepared, for example, by the reaction between organosilicone compounds of the following general formula (B)

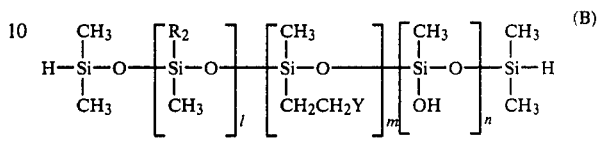

in which $R_2$, Y, k, l, m and n have, respectively, the same meanings as defined with regard to the formula (A), and a fatty acid represented by the formula, $R_1COOH$, in which $R_1$ has the same meaning as defined before. The above reaction is a dehydrogenation reaction and is effected under reflux in a solvent in the presence of a metal catalyst such as Pt or a platinum chloride catalyst. For instance, a predetermined amount of a fatty acid is charged into a solvent such as benzene, toluene, or the like along with a 5% platinum chloride isopropanol solution. While the mixture is heated under reflux, a predetermined amount of an organosilicone compound of the formula (B) is dropped into the mixture, for example, in 2 hours. After completion of the dropping, the reflux is continued for further 7 hours to obtain an organosilicone compound of the formula (A).

In the practice of the present invention, any known binders and magnetic materials for these purposes are used. Examples of the magnetic materials include ferromagnetic iron oxide materials such as gamma-$Fe_2O_3$ and $Fe_3O_4$ with or without additional metals such as Co, Ni, Mn, and the like, ferromagnetic metals such as Fe, Co, Ni, and alloys thereof such as Fe—Co, F—Ni, Co—Ni, and Fe—Co—Ni with or without other metals such as Al, Cr, Mn, Cu, Zn, and the like.

Useful binders are any known thermoplastic resins, thermosetting resins, and mixtures thereof. Typical of the thermoplastic resins are vinyl chloride-vinyl acetate copolymers, vinyl chloride-vinylidene chloride copolymers, acrylic ester-styrene copolymers, methacrylic ester-styrene copolymers, acrylic ester-vinylidene chloride copolymers, methacrylic ester-vinylidene chloride copolymers, urethane elastomers, cellulose derivatives, vinyl chloride-vinyl acetate-vinyl alcohol terpolymers, and various other synthetic resins. Examples of the thermosetting resins include phenolic resins, melamine resins, alkyd resins, silicone resins, urea-formaldehyde resins, mixtures of isocyanates and polyols, and the like. These binder resins may be used singly or in combination. Typical solvents for these binders are aromatic compounds such as xylene, toluene, benzene, and the like, ketones such as methyl ethyl ketone, methyl isobutyl ketone, and the like, and mixtures thereof. Broadly, magnetic particles are used in an amount of 200 to 800 parts by weight per 100 parts by weight of a binder, which may, more or less, vary depending on the type of recording medium as is well known in the art. The fatty acid-modified, fluorinated organosilicone compounds of the present invention are used, as indicated before, in an amount of from about 0.5 to 10 wt%, preferably 1 to 8 wt% based on the weight of the magnetic particles used.

In fabricating the magnetic recording medium of the present invention, binder resins, magnetic particles, and an organosilicone compound of the formula (A) are mixed in predetermined ratios in a solvent and kneaded in a suitable kneading machine such as a three roll mixer, ball mill, sand grinder, kneader, or the like. The resulting magnetic paint is passed through a filter to remove foreign matters therefrom and applied to a base, followed by drying, calendering and curing as usual, thereby obtaining a magnetic recording medium. The base may be in the form of films, foils, or sheets made of a variety of materials such as synthetic or semi-synthetic resins, metals, and glasses or ceramics. As a matter of course, known additives may be added at the stage of the kneading, including dispersing agents, other lubricants, abrasive agents, anti-static agents, and the like.

The recording media of the invention are not limited only to video tapes, but include audio tapes, magnetic cards, magnetic discs, and the like.

The present invention is described in more detail by way of example.

EXAMPLE 1

100 parts by weight of Co-gamma-$Fe_2O_3$, 10 parts by weight of vinyl chloride-vinyl acetate-vinyl alcohol terpolymer (VAGH, trade name of Union Carbide Corp. of U.S.A.), 10 parts by weight of polyurethane elastomer (Pandex T-5260, made by Dainippon Ink Co., Ltd.), 1 part by weight of lecithin, 300 parts by weight of a mixed solvent of toluene, methyl ethyl ketone and methyl isobutyl ketone, and about 2 parts by weight of a compound of the formula (A) in which $R_1 = C_{17}H_{33}$, $R_2 = CH_3$, each $R_3 = C_{17}H_{33}COO$, $Y = CF_3$, $l = 45$, $m = 38$, and $n = 13$, were mixed in a sand mill for about 20 hours. To the resulting mixture was added about 5 parts by weight of polyisocyanate (Coronate L, Nippon Polyurethane Ind. Co., Ltd.). The resulting magnetic paint was applied onto an about 14.5 microns thick polyester film, dried and calendered in a thickness of 5.5 microns after the calendering. The thus calendered film was cured at about 60° C. for 24 hours and was then slit into a ½ inch wide magnetic tape suitable for video tape recording purposes.

EXAMPLES 2 AND 3

The general procedure of Example 1 was repeated using, instead of the fatty acid-modified, fluorinated organosilicone compound used in Example 1, a fatty acid-modified, fluorinated organosilicone compound of the formula (A) in which $R_1 = C_{13}H_{27}$, $R_2 = CH_3$, each $R_3 = C_{13}H_{27}COO$, $Y = CF_3$, $l = 30$, $m = 38$, and $n = 20$ (Example 2), and a fatty acid-modified, fluorinated compound of the general formula (A) in which $R_1 = C_{13}H_{27}$, $R_2 = CH_3$, each $R_3 = C_{13}H_{27}COO$, $Y = (CF_2)_7CF_3$, $l = 25$, $m = 6$, and $n = 14$ (Example 3). As a result, two magnetic tapes were obtained.

COMPARATIVE EXAMPLES 1 AND 2

The general procedure of Example 1 was repeated using, instead of the fatty acid-modified, fluorinated organosilicone compound used in Example 1, an organosilicone compound of the general formula (I) in which $R = R' = C_{11}H_{23}$, $m = 35$, and $n = 65$, and an organosilicone compound of the general formula (II) in which $R = C_9H_{19}$, $m = 5$, and $n = 5$, thereby obtaining two magnetic tapes.

The magnetic tapes obtained in Examples and Comparative Examples were subjected to the measurement of a coefficient of kinetic friction, $\mu_k$, under conditions of 20° C. and 60% R.H. As a result, it was found that the coefficient of kinetic friction was 0.21 for the tape of Example 1, 0.20 for the tape of Example 2, and 0.19 for the tape of Example 3. Thus, the coefficients of the tapes of the invention were very small. In contrast, the tapes of Comparative examples 1 and 2 had coefficients of kinetic friction as high as 0.22 and 0.25, respectively. Moreover, each tape was subjected to a test in which the tape was contacted with about a 40 mm$\phi$ rotary drum and the drum was rotated at a speed of 200 r.p.m. at a normal temperature to record an increasing tendency of the coefficient of kinetic friction. From this, the abrasion resistance of each tape was determined. As a result, it was found that the magnetic tapes of the invention showed very excellent abrasion resistance on the magnetic layers, but the tapes of Comparative examples 1 and 2 were not so good.

Further, each tape was subjected to the measurement of stiffness (mg) which has close relation with hardness or flexibility of a magnetic layer of a magnetic tape. This test revealed that the stiffness was 135 for the tape of Example 1, 125 for the tape of Example 2, and 140 for the tape of Example 3. From this, it was found that the magnetic layers of these tapes were not plasticized and had excellent durability. On the contrary, the tapes of Comparative Examples 1 and 2 had stiffnesses of 105 and 95, respectively. These tapes were considerably plasticized and were poor in durability with a tendency of causing magnetic heads to be stained.

EXAMPLE 4

The procedure of Example 1 was repeated using different amounts of the organosilicone compound used in Example 1. The resulting tapes were each subjected to the measurement of the coefficient of kinetic friction. The results are shown in the sole FIGURE. From the FIGURE, it will be seen that the addition of the silicone compound only in a small amount ensures a sharp reduction of the coefficient.

EXAMPLES 5 THROUGH 7

The general procedure of Example 1 was repeated using, instead of the fatty acid-modified, fluorinated organosilicone compound used in Example 1, an organosilicone compound of the formula (A) in which $R_1 = C_{13}H_{27}$, $R_2 = CH_3$, each $R_3 = C_{13}H_{27}$, $Y = (CF_2)_7CF_3$, $l = 75$, $m = 75$, and $n = 75$ (Example 5), an organosilicone compound of the formula (A) in which $R_1 = C_{13}H_{27}$, $R_2 = CH_3$, each $R_3 = C_{13}H_{27}$, $Y = (CF_2)_7CF_3$, $l = 180$, $m = 45$, and $n = 45$ (Example 6), and an organo-silicone compound of the formula (A) in which $R_1 = C_{13}H_{27}$, $R_2 = CH_3$, each $R_3 = C_{13}H_{27}$, $Y = (CF_2)_7CF_3$, $l = 90$, $m = 90$, and $n = 90$ (Example 7). As a result, three magnetic tapes were obtained. These tapes were subjected to the measurement of the coefficient of kinetic friction and th stiffness (mg) similar to the foregoing examples. It was found that the coefficient of kinetic friction and the stiffness were, respectively, 0.20 and 120 for the tape of example 5, 0.18 and 115 for the tape of Example 6, and 0.20 and 115 for the tape of Example 7.

What is claimed is:

1. A magnetic recording medium which comprises a support having thereon a recording magnetic layer which is made of a dispersion of magnetic particles in a mixture of a binder and a lubricant, the lubricant being a fatty acid-modified, fluorinated organosilicone compound of the following general formula (A)

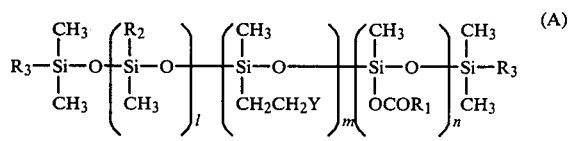

in which $R_1$ represents a monovalent saturated or unsaturated hydrocarbon group having from 7 to 21 carbon atoms, $R_2$ represents a methyl or phenyl group, each $R_3$ represents a $OCOR_1$ group wherein $R_1$ has the same meaning as defined above, Y represents $-CF_3$ or $-(CF_2)-_kW$ in which k is an integer of from 1 to 8, and W represents hydrogen or fluorine, l, m and n are independently an integer provided that $0 \leq l < 200$, $1 \leq m < 100$, $1 \leq n < 100$, and $l+m+n \leq 300$.

2. A magnetic recording medium according to claim 1, wherein said oranosilicone compound is contained in an amount of from about 0.5 to 10 wt% of said magnetic particles.

3. A magnetic recording medium according to claim 1, wherein in the formula (A), $0 \leq l < 100$, and $l+m+n \leq 200$.

4. A magnetic recording medium according to claim 1, wherein in the formula (A), $R_1$ represents $C_{13}H_{27}$, $R_2$ represents $CH_3$, each $R_3$ represents $C_{13}H_{27}COO$, and Y represents $-(CF_2)_7CF_3$.

5. A magnetic recording medium according to claim 1, wherein in the formula (A), $R_2$ represents a phenyl group and the phenyl group is contained in an amount of below about 10 mol% of the total organic groups joined to Si atoms in said organosilicone compound.

6. A magnetic recording medium according to claim 1, wherein said medium is a video recording tape.

* * * * *